United States Patent
Bian (10) Patent No.: US 12,292,596 B2
(45) Date of Patent: May 6, 2025

(54) STRUCTURES FOR AN OPTICAL COUPLER AND RELATED METHODS

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 340 days.

(21) Appl. No.: 17/892,584

(22) Filed: Aug. 22, 2022

(65) Prior Publication Data

US 2024/0061176 A1  Feb. 22, 2024

(51) Int. Cl.
*G02B 6/122* (2006.01)

(52) U.S. Cl.
CPC .................................. *G02B 6/1228* (2013.01)

(58) Field of Classification Search
CPC .............................. G02B 6/12; G02B 6/1228
See application file for complete search history.

(56) References Cited

U.S. PATENT DOCUMENTS

| | | | |
|---|---|---|---|
| 9,726,821 B2 * | 8/2017 | Murray | G02B 6/4212 |
| 9,904,011 B2 * | 2/2018 | Hatori | G02B 6/12002 |
| 10,690,845 B1 | 6/2020 | Jacob et al. | |
| 10,816,726 B1 | 10/2020 | Peng et al. | |
| 11,366,269 B2 | 6/2022 | Bian | |
| 2012/0230635 A1 * | 9/2012 | Yoshida | G02B 6/125 385/43 |
| 2018/0120504 A1 * | 5/2018 | Qi | G02B 6/3636 |
| 2019/0391336 A1 * | 12/2019 | Wong | G02B 6/305 |
| 2020/0124797 A1 * | 4/2020 | Li | G02B 6/136 |
| 2021/0278585 A1 | 9/2021 | Nichol et al. | |
| 2021/0278611 A1 | 9/2021 | Sahin et al. | |
| 2022/0091335 A1 * | 3/2022 | Bian | G02B 6/125 |

OTHER PUBLICATIONS

G.-H. Duan et al., "Hybrid III-V on Silicon Lasers for Photonic Integrated Circuits on Silicon," in IEEE Journal of Selected Topics in Quantum Electronics, vol. 20, No. 4, pp. 158-170, Jul.-Aug. 2014, Art No. 6100213, doi: 10.1109/JSTQE.2013.2296752.

Alexander W. Fang, Hyundai Park, Oded Cohen, Richard Jones, Mario J. Paniccia, and John E. Bowers, "Electrically pumped hybrid AlGaInAs-silicon evanescent laser," Optics Express 14, 9203-9210 (2006).

(Continued)

*Primary Examiner* — Tina M Wong
(74) *Attorney, Agent, or Firm* — Thompson Hine LLP; Anthony Canale (57) ABSTRACT

Structures for an optical coupler and methods of forming an optical coupler. The structure comprises a first waveguide core including a first tapered section, a second waveguide core including a second tapered section overlapped with the first tapered section, and an active layer including a third tapered section overlapped with the second tapered section. The first waveguide core comprises a first passive material, the second waveguide core comprises a second passive material, and the active layer comprises an active material.

20 Claims, 8 Drawing Sheets

(56) References Cited

OTHER PUBLICATIONS

Hyundai Park, Alexander W. Fang, Satoshi Kodama, and John E. Bowers, "Hybrid silicon evanescent laser fabricated with a silicon waveguide and III-V offset quantum wells," Optics Express 13, 9460-9464 (2005).

Y. Zhang, K. Shang, Y. Zhang and S. J. Ben Yoo, "Low-Loss Wafer-Scale Silicon Photonic Interposer Utilizing Inverse-Taper Coupler," 2018 IEEE Photonics Conference (IPC), 2018, pp. 1-2, doi: 10.1109/IPCon.2018.8527256.

Kuhan Guo, An He and Yikai Su, "Recent advances of heterogeneously integrated III-V laser on Si," Journal of Semiconductors, vol. 40, No. 10, 101304, pp. 1-11 (2019).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC), OSA Technical Digest (Optica Publishing Group, 2020), paper T3H.3 (2020).

B. Peng et al., "A CMOS Compatible Monolithic Fiber Attach Solution with Reliable Performance and Self-alignment," In Optical Fiber Communication Conference (OFC), OSA Technical Digest (Optica Publishing Group, 2020), paper Th3I.4 (2020).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

Y. Bian et al., "Monolithically integrated silicon nitride platform," 2021 Optical Fiber Communications Conference and Exhibition (OFC), pp. 1-3, Th1A.46 (2021).

A. Aboketaf et al., "Towards fully automated testing and characterization for photonic compact modeling on 300-mm wafer platform," 2021 Optical Fiber Communications Conference and Exhibition (OFC), 2021, pp. 1-3.

Y. Bian et al., "Integrated Laser Attach Technology on a Monolithic Silicon Photonics Platform," 2021 IEEE 71st Electronic Components and Technology Conference (ECTC), 2021, pp. 237-244, doi: 10.1109/ECTC32696.2021.00048.

Y. Bian et al., "3D Integrated Laser Attach Technology on 300-mm Monolithic Silicon Photonics Platform," 2020 IEEE Photonics Conference (IPC), pp. 1-2, doi: 10.1109/IPC47351.2020.9252280 (2020).

Y. Bian et al., "Hybrid III-V laser integration on a monolithic silicon photonic platform," 2021 Optical Fiber Communications Conference and Exhibition (OFC), pp. 1-3 (2021).

T. Barwicz, S. Kamlapurkar, Y. Martin, R. L. Bruce and S. Engelmann, "A Silicon Metamaterial Chip-to-Chip Coupler for Photonic Flip-Chip Applications," 2017 Optical Fiber Communications Conference and Exhibition (OFC), 2017, pp. 1-3.

J. Yao et al., "Grating-coupler based low-loss optical interlayer coupling," 8th IEEE International Conference on Group V Photonics, 2011, pp. 383-385, doi: 10.1109/GROUP4.2011.6053824.

Bartlomiej Jan Pawlak et al., "Light Coupling Between Stacked Photonics Chips" filed on Jun. 7, 2022 as a U.S. Appl. No. 17/834,375.

Dezfulian, Kevin K. et al., "Hybrid Edge Couplers With Layers in Multiple Levels" filed on Feb. 8, 2021 as a U.S. Appl. No. 17/169,971.

Bartlomiej Jan Pawlak, "Photonics Chips and Semiconductor Products Having Angled Optical Fibers" filed on Oct. 25, 2021 as a U.S. Appl. No. 17/510,329.

Bian, Yusheng, "Edge Couplers With Metamaterial Rib Features" filed on Jul. 7, 2021 as a U.S. Appl. No. 17/369,253.

Bian, Yusheng et al., "Spot-Size Converters With Angled Facets" filed on Feb. 24, 2022 as a U.S. Appl. No. 17/679,188.

Sahin, Asli et al., "Photonics Integrated Circuit With Silicon Nitride Waveguide Edge Coupler" filed on Feb. 19, 2021 as a U.S. Appl. No. 17/179,532.

Bian, Yusheng et al., "Optical Components in the Back-End-Of-Line Stack of a Photonics Chip" filed on Jan. 12, 2021 as a U.S. Appl. No. 17/146,864.

Bian, Yusheng et al., "Edge Couplers in the Back-End-Of-Line Stack of a Photonics Chip" filed on Jan. 19, 2021 as a U.S. Appl. No. 17/151,955.

Bian, Yusheng et al., "Edge Couplers in the Back-End-Of-Line Stack of a Photonic Chip Having a Sealed Cavity" filed on Apr. 11, 2022 as a U.S. Appl. No. 17/658,821.

Bian, Yusheng, "Edge Couplers With Consecutively-Arranged Tapers" filed on Mar. 23, 2022 as a U.S. Appl. No. 17/701,918.

Bian, Yusheng, "Optical Couplers With Diagonal Light Transfer" filed on Nov. 11, 2021 as a U.S. Appl. No. 17/524,218.

\* cited by examiner

STRUCTURES FOR AN OPTICAL COUPLER AND RELATED METHODS

BACKGROUND

The disclosure relates to photonics chips and, more specifically, to structures for an optical coupler and methods of forming an optical coupler.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

Improved structures for an optical coupler and methods of forming an optical coupler are needed.

SUMMARY

In an embodiment of the invention, a structure for an optical coupler is provided. The structure comprises a first waveguide core including a first tapered section, a second waveguide core including a second tapered section overlapped with the first tapered section, and an active layer including a third tapered section overlapped with the second tapered section. The first waveguide core comprises a first passive material, the second waveguide core comprises a second passive material, and the active layer comprises an active material.

In an embodiment of the invention, a structure for an optical coupler is provided. The structure comprises a waveguide core including a first plurality of segments and an active layer including a second plurality of segments overlapped with the first plurality of segments. The waveguide core comprises a passive material, and the active layer comprises an active material.

In an embodiment of the invention, a method of forming a structure for an optical coupler is provided. The structure comprises forming a first waveguide core including a first tapered section, forming a second waveguide core including a second tapered section overlapped with the first tapered section, and forming an active layer including a third tapered section overlapped with the second tapered section. The first waveguide core comprising a first passive material, the second waveguide core comprises a second passive material, and the active layer comprising an active material.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
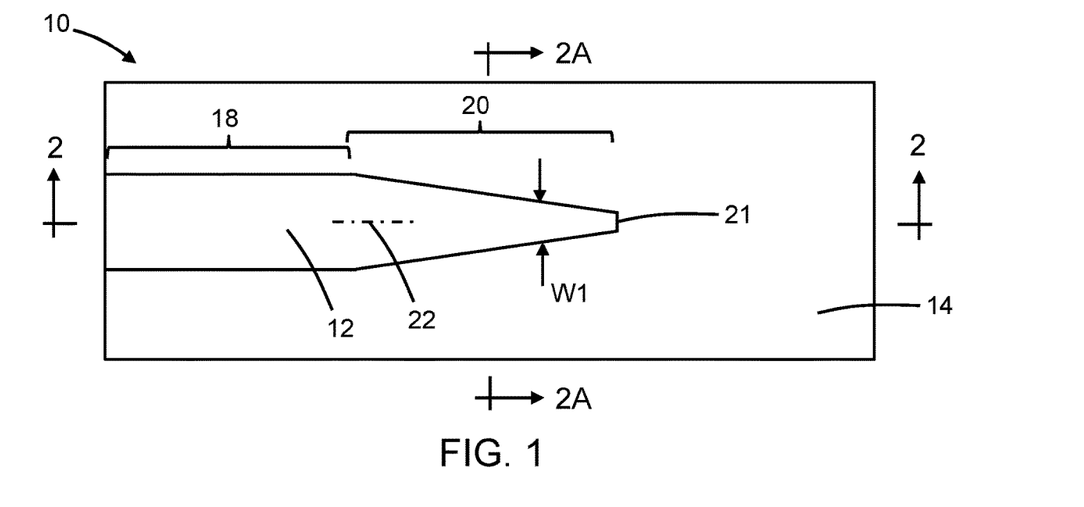
FIG. 1 is a top view of a structure at an initial fabrication stage of a processing method in accordance with embodiments of the invention.
Figure 2:
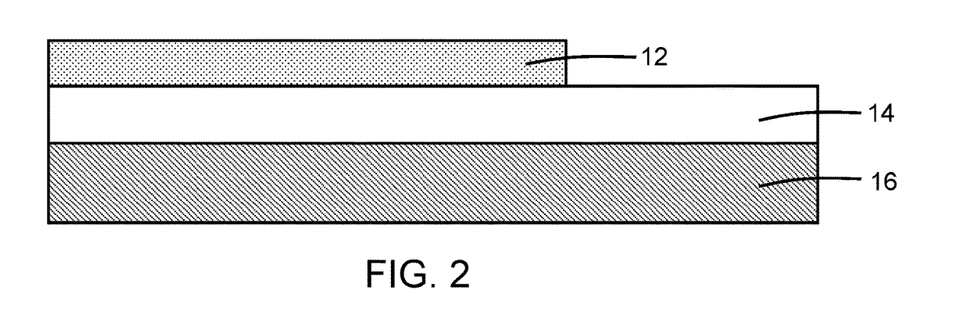
FIG. 2 is a cross-sectional view taken generally along line 2-2 in FIG. 1.
Figure 2A:
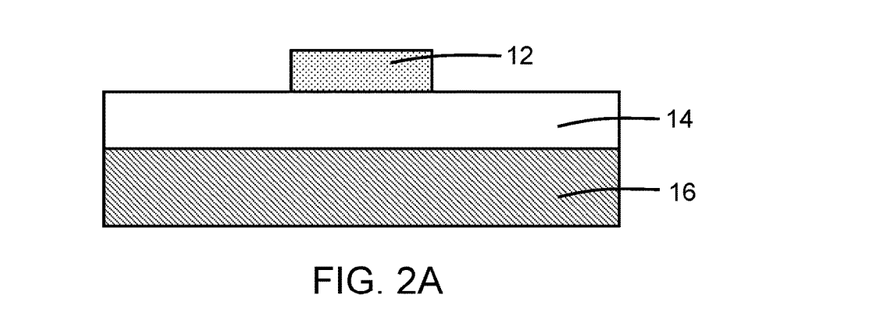
FIG. 2A is a cross-sectional view taken generally along line 2A-2A in FIG. 1

With reference to FIGS. 1, 2, 2A and in accordance with embodiments of the invention, a structure 10 includes a waveguide core 12 that is positioned over a dielectric layer 14 and a substrate 16. In an embodiment, the dielectric layer 14 may be comprised of a dielectric material, such as silicon dioxide, and the substrate 16 may be comprised of a semiconductor material, such as single-crystal silicon. In an embodiment, the dielectric layer 14 may be a buried oxide layer of a silicon-on-insulator substrate, and the dielectric layer 14 may separate the waveguide core 12 from the substrate 16. In an alternative embodiment, one or more additional dielectric layers comprised of, for example, silicon dioxide may separate the waveguide core 12 from the dielectric layer 14. In an alternative embodiment, the substrate 16 may include an undercut or cavity beneath the waveguide core 12 that may mitigate leakage loss to the substrate 16 and/or improve heater performance.

The waveguide core 12 may be comprised of a passive material that is not capable of generating, amplifying, or modulating light and that is capable of guiding light on a photonics chip. In an embodiment, the waveguide core 12 may be comprised of a passive material having a refractive index that is greater than the refractive index of silicon dioxide. In an embodiment, the waveguide core 12 may be comprised of a semiconductor material, such as single-crystal silicon or polysilicon. In an alternative embodiment, the waveguide core 12 may be comprised of a dielectric material, such as silicon nitride, silicon oxynitride, or aluminum nitride.

In an embodiment, the waveguide core 12 may be formed by patterning a layer comprised of a passive material with lithography and etching processes. In an embodiment, the waveguide core 12 may be formed by patterning the semiconductor material (e.g., single-crystal silicon) of a device layer of a silicon-on-insulator substrate. In an embodiment, the waveguide core 12 may be formed by patterning a deposited layer comprised of the passive material (e.g., polysilicon). In an alternative embodiment, a slab layer may be connected to all or part of a lower portion of the waveguide core 12. The slab layer may be formed when the waveguide core 12 is patterned, and the slab layer, which is positioned on the dielectric layer 14, has a thickness that is less than the thickness of the waveguide core 12.

The waveguide core 12 has a section 18 and a section 20 that are aligned along a longitudinal axis 22. The section 20 of the waveguide core 12 includes an end 21 that terminates the waveguide core 12. The waveguide core 12 may have a width dimension W1 that varies over the length of the section 20. In an embodiment, the width dimension W1 of the section 20 may longitudinally decrease with decreasing distance from the end 21. In an embodiment, the width dimension W1 of the section 20 may linearly increase with increasing distance from the end 21. In an alternative embodiment, the width dimension W1 of the section 20 may increase based on a non-linear function, such as a quadratic function, a cubic function, a parabolic function, a sine function, a cosine function, a Bezier function, or an exponential function. In an embodiment, the section 20 may have a uniform taper angle as a result of the decreasing width dimension W1. In an alternative embodiment, the section 20 may taper in multiple stages each having a different taper angle. In an alternative embodiment, the section 20 of the waveguide core 12 may be a component of a multi-tip (e.g., trident) waveguide that includes additional tips. The section 18 of the waveguide core 12 may be connected to other optical components.

Figure 3:
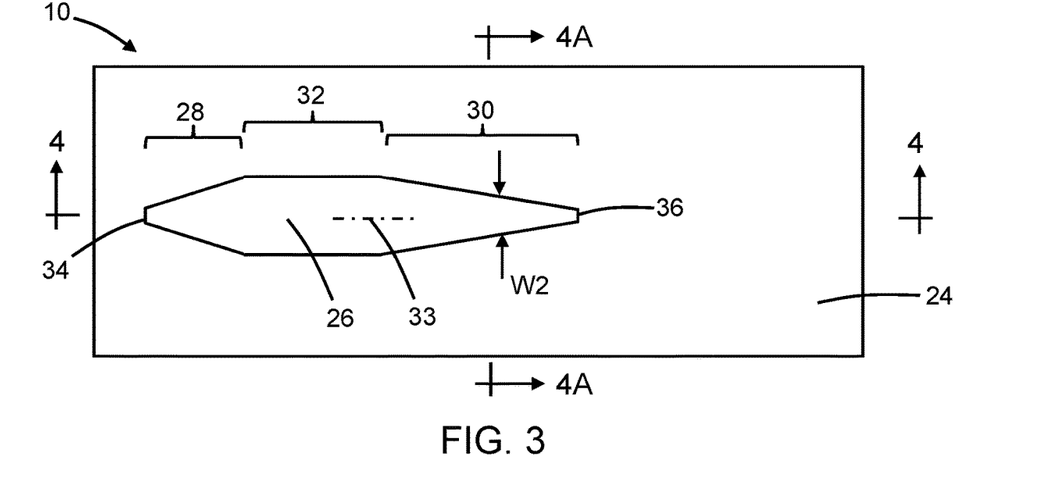
FIG. 3 is a top view of the structure at a fabrication stage of the processing method subsequent to FIG. 1.
Figure 4:
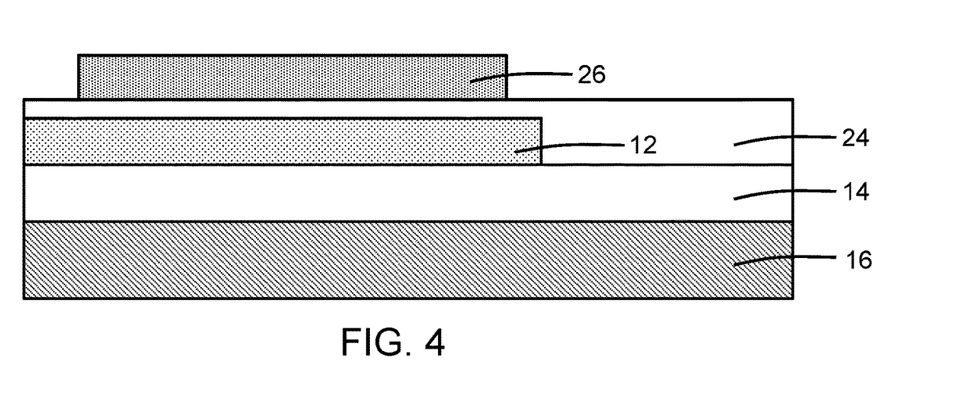
FIG. 4 is a cross-sectional view taken generally along line 4-4 in FIG. 3.
Figure 4A:
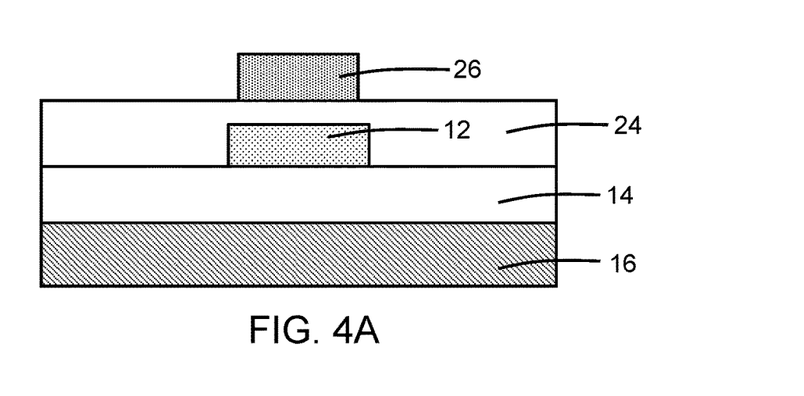
FIG. 4A is a cross-sectional view taken generally along line 4A-4A in FIG. 3.

With reference to FIGS. 3, 4, 4A in which like reference numerals refer to like features in FIGS. 1, 2, 2A and at a subsequent fabrication stage, a dielectric layer 24 is formed over the waveguide core 12. The dielectric layer 24 may be comprised of a dielectric material, such as silicon dioxide, that is deposited and then planarized. In an embodiment, the waveguide core 12 may be embedded in the dielectric layer 24, which may be thicker than the waveguide core 12. The dielectric material constituting the dielectric layer 24 may have a refractive index that is less than the refractive index of the material constituting the waveguide core 12. The waveguide core 12 is surrounded by, and encased in, the dielectric materials of the dielectric layer 14 and the dielectric layer 24.

A waveguide core 26 is formed over the dielectric layer 24. The waveguide core 26 has a section 28, a section 30, and a section 32 that connects the section 28 to the section 30. The waveguide core 26 extends lengthwise between an end 34 that terminates the section 28 and an end 36 that terminates the section 30 such that the waveguide core 26 is truncated with a finite length between the opposite ends 34, 36. The sections 28, 30, 32 of the waveguide core 26 may be lengthwise aligned between the opposite ends 34, 36 along the longitudinal axis 33. In an embodiment, the end 36 of the waveguide core 26 may be offset longitudinally from the end 21 of the waveguide core 12.

The waveguide core 26 may have a width dimension W2 that varies over the respective lengths of the section 28 and the section 30. In an embodiment, the width dimension W2 of the section 28 may longitudinally increase with increasing distance from the end 34 between a minimum width and a maximum width at the boundary with section 32. In an embodiment, the width dimension W2 of the section 30 may longitudinally increase with increasing distance from the end 36 between a minimum width and a maximum width at the boundary with section 32. The width dimension W2 of the section 28 may longitudinally increase opposite to the longitudinal increase in the width dimension of the section 30. In an embodiment, the width dimension W2 of the sections 28, 30 may linearly increase with increasing distance from the respective ends 34, 36. In an alternative embodiment, the width dimension W2 of the sections 28, 30 may increase based on a non-linear function, such as a quadratic function, a cubic function, a parabolic function, a sine function, a cosine function, a Bezier function, or an exponential function. In an embodiment, the sections 28, 30 may each have a uniform taper angle as a result of the increasing width dimension W2. In an alternative embodiment, the sections 28, 30 may taper in multiple stages each having a different taper angle.

The waveguide core 26 may be comprised of a passive material that is not capable of generating, amplifying, or modulating light. In an embodiment, the waveguide core 26 may be comprised of a passive material having a refractive index that is greater than the refractive index of silicon dioxide. In an embodiment, the waveguide core 26 may be comprised of a different passive material than the waveguide core 12. In an embodiment, the waveguide core 26 may be comprised of a dielectric material, such as silicon nitride, aluminum nitride, or silicon oxynitride. In an alternative embodiment, the waveguide core 26 may be comprised of a semiconductor material, such as polysilicon or amorphous silicon. In an embodiment, the waveguide core 26 may be formed by depositing a layer comprised of the passive material on the dielectric layer 24 and patterning the deposited layer with lithography and etching processes. In an alternative embodiment, a slab layer may be connected to a lower portion of the waveguide core 26. The slab layer may be formed when the waveguide core 26 is patterned, and the slab layer, which is positioned on the dielectric layer 24, has a thickness that is less than the thickness of the waveguide core 26.

The waveguide core 26 is positioned to overlap with the waveguide core 12. In an embodiment, the section 30 of the waveguide core 26 may overlap at least in part with the section 20 of the waveguide core 12. In an embodiment, the longitudinal axis 33 of the waveguide core 26 may be aligned either collinear or substantially collinear with the longitudinal axis 22 of the waveguide core 12.

Figure 5:
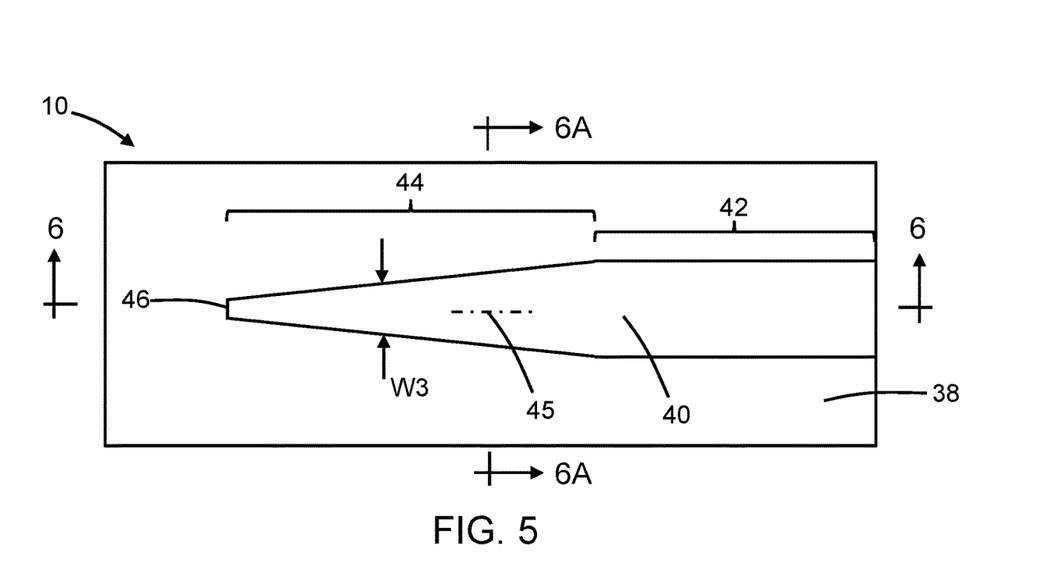
FIG. 5 is a top view of the structure at a fabrication stage of the processing method subsequent to FIG. 1.
Figure 6:
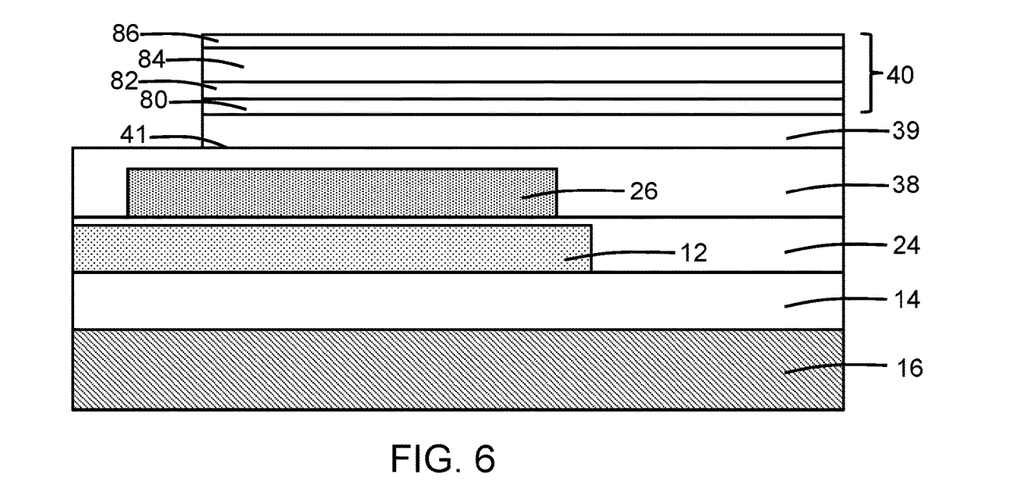
FIG. 6 is a cross-sectional view taken generally along line 6-6 in FIG. 5.
Figure 6A:
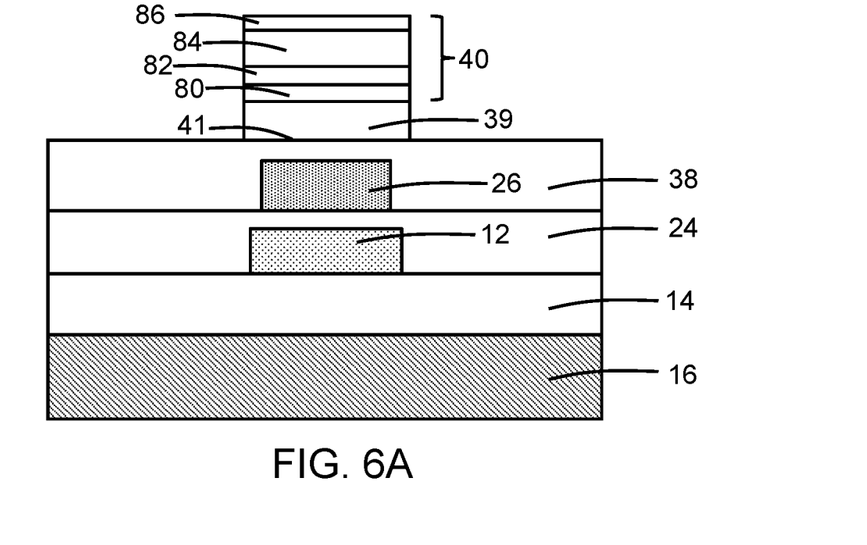
FIG. 6A is a cross-sectional view taken generally along line 6A-6A in FIG. 5.

With reference to FIGS. 5, 6, 6A in which like reference numerals refer to like features in FIGS. 3, 4, 4A and at a subsequent fabrication stage, a dielectric layer 38 is formed over the waveguide core 26. The dielectric layer 38 may be comprised of a dielectric material, such as silicon dioxide, that is deposited and then planarized. In an embodiment, the waveguide core 26 may be embedded in the dielectric layer 38, which may be thicker than the waveguide core 26. The dielectric material constituting the dielectric layer 38 may have a refractive index that is less than the refractive index of the material constituting the waveguide core 26. The waveguide core 26 is surrounded by, and encased in, the dielectric materials of the dielectric layer 38 and the dielectric layer 24.

A layer stack 40 and a dielectric layer 39 associated with the layer stack 40 may be positioned on the dielectric layer 38. The layer stack 40 may include multiple layers 80, 82, 84, 86 that are stacked in a vertical direction. In an embodiment, at least one of the layers 80, 82, 84, 86 in the layer stack 40 may comprise an active material capable of generating light. In an embodiment, the layers 80, 82, 84, 86 of the layer stack 40 may be assembled together to provide a semiconductor laser that is configured to generate and emit light. In an embodiment, one or more of the layers 80, 82, 84, 86 in the layer stack 40 may be comprised of a III-V compound semiconductor material, such as gallium nitride, indium gallium nitride, indium phosphide, indium gallium arsenide, gallium arsenide, or indium gallium phosphide, as an active material. In an embodiment, one or more of the layers 80, 82, 84, 86 in the layer stack 40 may be comprised of an active material selected from barium titanate or lithium niobate. In an embodiment, the layers 80, 82, 84, 86 in the layer stack 40 may define a multiple quantum well including one or more active materials. In an embodiment, the layer stack 40 may be characterized as a mesa structure in which the layers 80, 82, 84, 86 are patterned to define the mesa. In an embodiment, the layer stack 40 may lack silicon in any of the layers 80, 82, 84, 86. In an alternative embodiment, the layer stack 40 may be replaced by a single layer including an active material.

In an embodiment, the layer stack 40 may be manufactured on a handle substrate, and transferred from the handle substrate to the substrate 16 supporting the waveguide cores 12, 26. In an embodiment, the dielectric layer 39 associated with the layer stack 40 may be bonded to the dielectric layer 38 at a bonding interface 41, and the handle substrate may be removed following the bonding operation. The dielectric layers 38, 39 adjoin along the bonding interface 41. In an embodiment, the layer stack 40 may have one or more external electrical connections established by, for example, flip-chip bonding or wire bonding.

The layer stack 40 has a section 42 and a section 44 that are aligned along a longitudinal axis 45. The section 44 of the layer stack 40 includes an end 46 that terminates the layer stack 40. The layer stack 40 may have a width dimension W3, and the width dimension W3 may vary over the length of the section 44. In an embodiment, the width dimension W3 of the section 44 may longitudinally increase with increasing distance from the end 46. In an embodiment, the width dimension W3 of the section 44 may linearly increase with increasing distance from the end 46. In an alternative embodiment, the width dimension W3 of the section 44 may increase based on a non-linear function, such as a quadratic function, a cubic function, a parabolic function, a sine function, a cosine function, a Bezier function, or an exponential function. In an embodiment, the section 44 may have a uniform taper angle as a result of the increasing width dimension W3. In an alternative embodiment, the section 44 may taper in multiple stages each having a different taper angle.

The layer stack 40 may be positioned to overlap with the waveguide core 26 and to also overlap with the waveguide core 12. In an embodiment, the section 44 of the layer stack 40 may overlap at least in part with the section 30 of the waveguide core 26, which in turn overlaps at least in part with the section 20 of the waveguide core 12, such that the section 20, section 30, and section 44 have a stacked arrangement. The section 30 of the waveguide core 26 may be arranged in a vertical direction between the section 44 of the layer stack 40 and the section 20 of the waveguide core 12. In an embodiment, the longitudinal axis 45 of the layer stack 40 may be aligned either collinear or substantially collinear with the longitudinal axis 33 of the waveguide core 26.

The section 20 of the waveguide core 12, the section 30 of the waveguide core 26, and the section 44 of the layer stack 40 may function as an optical coupler for transferring light. In an embodiment, light generated by the layer stack 40 may be transferred by the optical coupler from the layer stack 40 to the section 20 of the waveguide core 12. The waveguide core 26 may assist with the light transfer and, in particular, the stacking of the section 30 of the waveguide core 26 with the section 20 of the waveguide core 12 and with the section 44 of the layer stack 40 may assist with the light transfer.

The stacked arrangement of the section 20 and the section 30 may provide additional design freedom to match the effective refractive index of the layer stack 40 to the refractive index of the waveguide core 12 and enable more efficient optical coupling from the layer stack 40 to the waveguide core 12. For example, the section 30 may assist with overcoming an index mismatch created by the active material of the layer stack 40 having a higher refractive index than the passive material of the waveguide core 12, as well as assisting with matching the larger size of the mode profile of light emitted from the layer stack 40 with the mode profile of the transferred light that is guided by the waveguide core 12.

Figure 7:
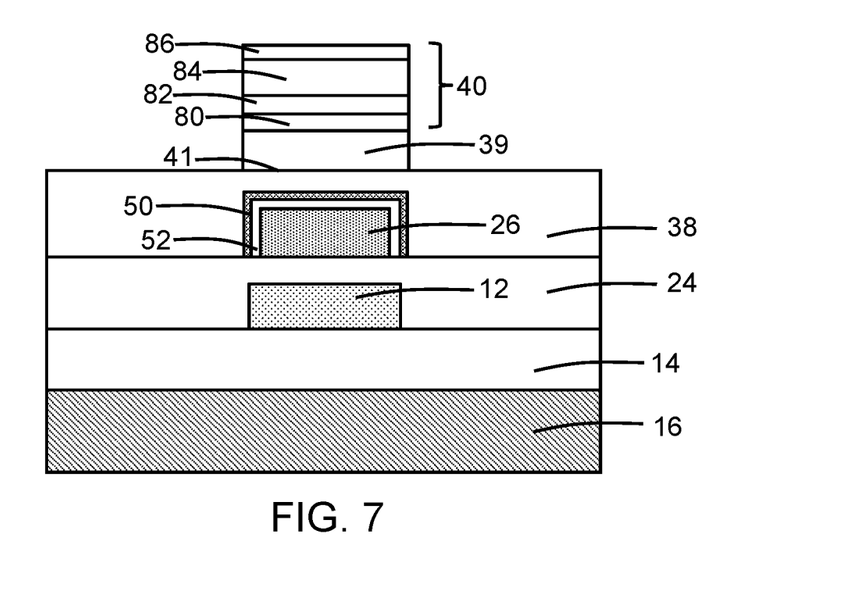
FIG. 7 is a cross-sectional view of a structure in accordance with alternative embodiments of the invention.

With reference to FIG. 7 and in accordance with alternative embodiments, the waveguide core 26 may be partially surrounded by a dielectric layer 50 and a dielectric layer 52 may be positioned between the dielectric layer 38 and the waveguide core 26. The dielectric layers 50, 52 may be conformal layers comprised of different dielectric materials that adapt to the shape of the waveguide core 26. In an embodiment, the dielectric layer 50 may be comprised of silicon nitride and the dielectric layer 52 may be comprised of silicon dioxide. In an embodiment, the dielectric layer 50 may be comprised of silicon nitride, the dielectric layer 52 may be comprised of silicon dioxide, and the waveguide core 26 may be comprised of polysilicon.

Figure 8:
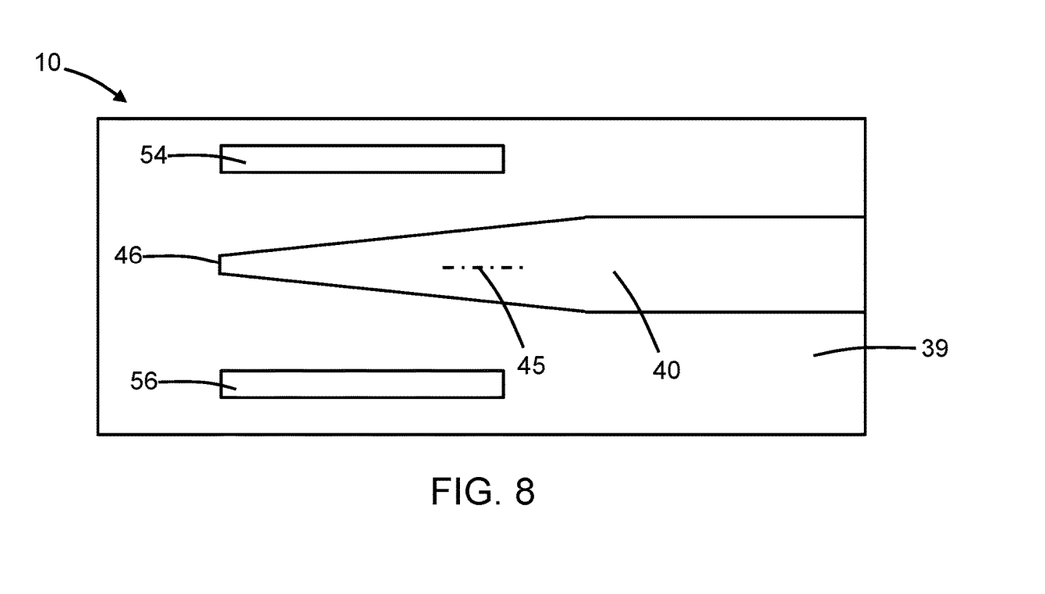
FIG. 8 is a top view of a structure in accordance with alternative embodiments of the invention.

With reference to FIG. 8 and in accordance with alternative embodiments, features 54, 56 may be positioned as satellites adjacent to opposite sides of the section 44 of the layer stack 40. The features 54, 56 may be comprised of the same layers 80, 82, 84, 86 as the layer stack 40, and may define a multiple-tip arrangement in combination with the layer stack 40.

Figure 9:
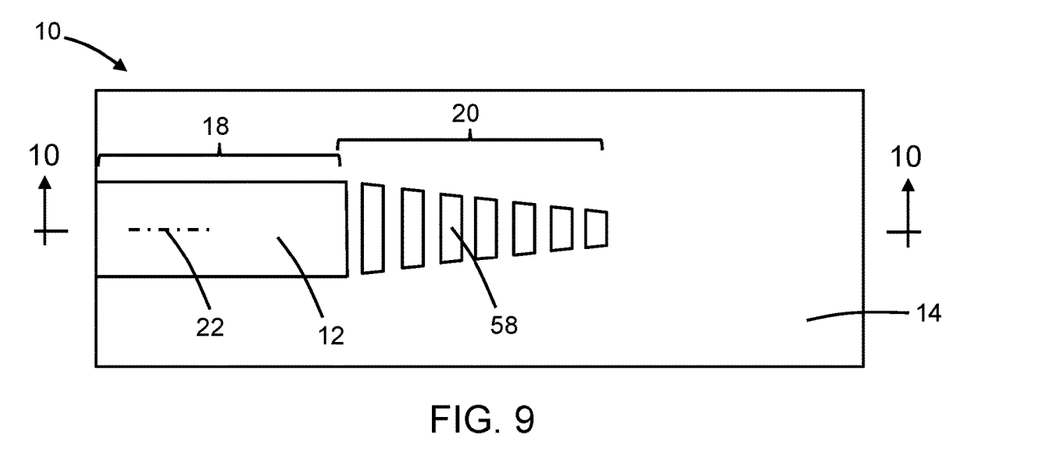
FIG. 9 is a top view of a structure at a fabrication stage of a processing method in accordance with alternative embodiments of the invention.
Figure 10:
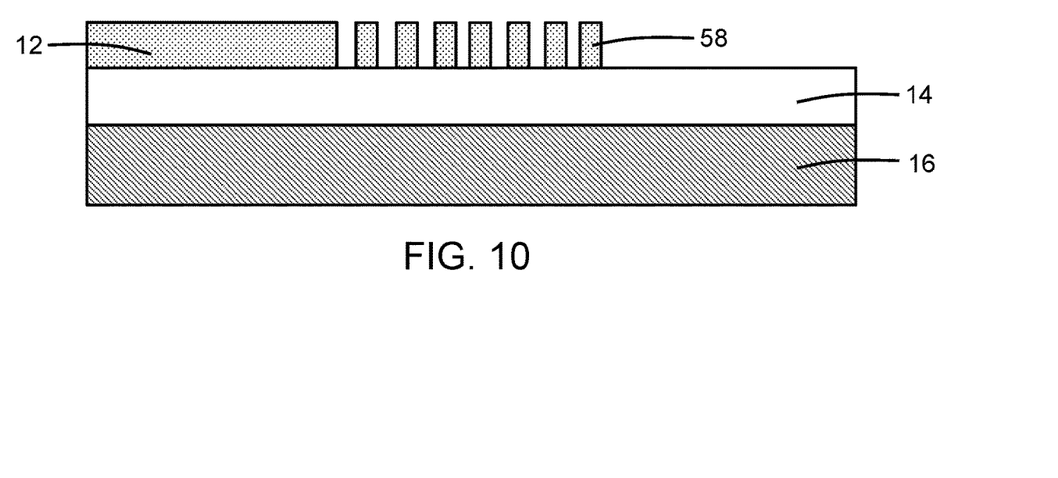
FIG. 10 is a cross-sectional view taken generally along line 10-10 in FIG. 9.

With reference to FIGS. 9, 10 and in accordance with alternative embodiments, the section 20 of the waveguide core 12 may include segments 58 that are positioned with a spaced-arrangement along the longitudinal axis 22. Adjacent pairs of the segments 58 are separated by spaces or gaps. In an alternative embodiment, a rib, which may be tapered, may extend longitudinally from the section 18 and be overlaid on the segments 58. In an alternative embodiment, a rib, which may be tapered, may extend longitudinally from the section 18 and be overlaid on some of the segments 58 that are adjacent to the section 18. In an alternative embodiment, a rib, which may be tapered, may extend longitudinally from the section 18 and be overlaid on all of the segments 58.

In an embodiment, the pitch and duty cycle of the segments 58 may be uniform to define a periodic arrangement. In alternative embodiments, the pitch and/or the duty cycle of the segments 58 may be apodized (i.e., non-uniform) to define a non-periodic arrangement. The segments 58 may be dimensioned and positioned at small enough pitch so as to define a subwavelength grating that does not radiate or reflect light at a wavelength of operation, such as a wavelength in a range of 400 nm to 3000 nm.

The subsequently-deposited dielectric layer 24 is disposed in the gaps between adjacent pairs of the segments 58. The segments 58 and the dielectric material of the dielectric layer 24 in the gaps between adjacent pairs of the segments 58 may define a metamaterial structure in which the material constituting the segments 58 has a higher refractive index than the dielectric material of the dielectric layer 24. The metamaterial structure can be treated as a homogeneous material having an effective refractive index that is intermediate between the refractive index of the material constituting the segments 58 and the refractive index of the dielectric material constituting the dielectric layer 24.

Figure 11:
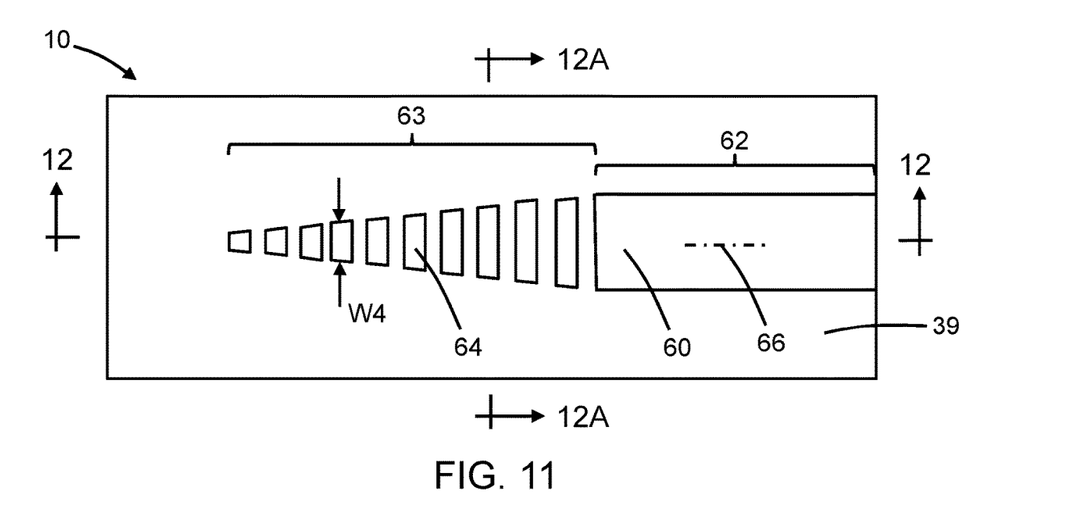
FIG. 11 is a top view of the structure at a fabrication stage of the processing method subsequent to FIG. 9.
Figure 12:
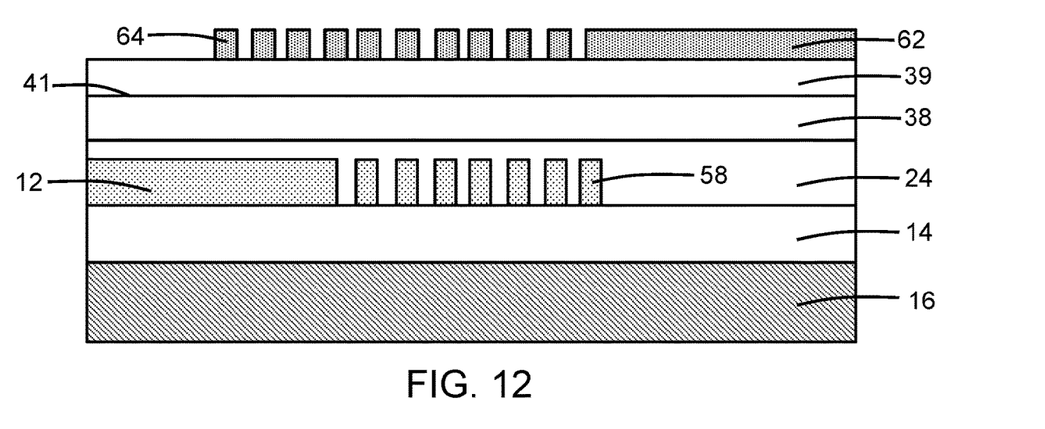
FIG. 12 is a cross-sectional view taken generally along line 12-12 in FIG. 11.
Figure 12A:
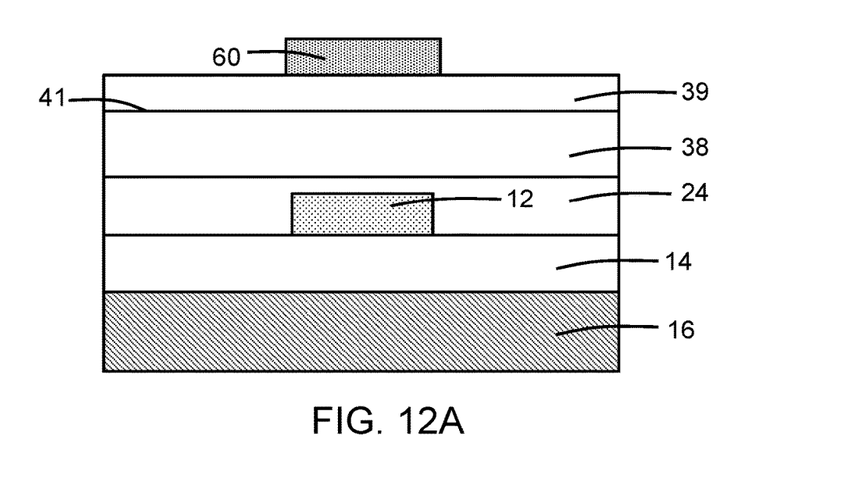
FIG. 12A is a cross-sectional view taken generally along line 12A-12A in FIG. 11.

With reference to FIGS. 11, 12, 12A in which like reference numerals refer to like features in FIGS. 9, 10 and at a subsequent fabrication stage, an active layer 60 may be positioned on the dielectric layers 38, 39. The active layer 60 may include a section 62 and a section 63 with segments 64 that are positioned with a spaced-arrangement along a longitudinal axis 66. Adjacent pairs of the segments 64 are separated by spaces or gaps. In an alternative embodiment, a rib, which may be tapered, may extend longitudinally from the section 62 and be overlaid on the segments 64. In an alternative embodiment, a rib, which may be tapered, may extend longitudinally from the section 62 and be overlaid on some of the segments 64 adjacent to the section 62. In an alternative embodiment, a rib, which may be tapered, may extend longitudinally from the section 62 and be overlaid on all of the segments 64. The section 62 of the active layer 60 may be non-segmented.

In an embodiment, the active layer 60 may be comprised of an active material capable of amplifying, modulating, or generating light. In an embodiment, the active layer 60 may be comprised of a III-V compound semiconductor material, such as gallium nitride, indium gallium nitride, indium phosphide, indium gallium arsenide, gallium arsenide, or indium gallium phosphide, as an active material. In an embodiment, the active layer 60 may be comprised of an active material selected from barium titanate or lithium niobate. In an alternative embodiment, the active layer 60 may be replaced by the multiple layers 80, 82, 84, 86 of the layer stack 40, which may be segmented similar to active layer 60.

In an embodiment, the active layer 60 may be manufactured on a handle substrate, and transferred from the handle substrate to the substrate 16 supporting the waveguide core 12. In an embodiment, the dielectric layer 39 may be bonded to the dielectric layer 38 at the bonding interface 41 to enable the transfer, and the handle substrate may be removed following the bonding operation.

In an embodiment, the pitch and duty cycle of the segments 64 may be uniform to define a periodic arrangement. In alternative embodiments, the pitch and/or the duty cycle of the segments 64 may be apodized (i.e., non-uniform) to define a non-periodic arrangement. The segments 64 may be dimensioned and positioned at small enough pitch so as to define a subwavelength grating that does not radiate or reflect light at a wavelength of operation, such as a wavelength in a range of 400 nm to 3000 nm.

The segments 64 may have a width dimension W4 that varies with position along the longitudinal axis 66. In an embodiment, the width dimension W4 of the segments 64 may increase with increasing distance from the segment 64 terminating the section 62. In an embodiment, the width dimension W4 of the segments 64 may linearly increase with increasing distance from the segment 64 terminating the section 62. In an alternative embodiment, the width dimension W3 of the segments 64 may increase based on a non-linear function, such as a quadratic function, a cubic function, a parabolic function, a sine function, a cosine function, a Bezier function, or an exponential function. In an embodiment, the segments 64 may have a uniform taper angle as a result of the increasing width dimension W4. In an alternative embodiment, the segments 64 may taper in multiple stages each having a different taper angle.

The segments 64 of the active layer 60 may be positioned to overlap with the segments 58 of the waveguide core 12 such that the segments 58 and the segments 64 have a stacked arrangement. In an embodiment, the segments 64 may fully overlap with the segments 58 of the waveguide core 12. In an embodiment, the longitudinal axis 66 of the active layer 60 may be aligned either collinear or substantially collinear with the longitudinal axis 22 of the waveguide core 12.

The segments 64 of the section 63 of the active layer 60 and the segments 58 of the section 20 of the waveguide core 12 may function as an optical coupler. Light may be transferred by the optical coupler between the segments 64 of the section 63 of the active layer 60 and the segments 58 of the section 20 of the waveguide core 12. In an embodiment, the light may be generated by the active layer 60 and transferred by the overlapped sections 20, 63 to the waveguide core 12. In an embodiment, the light may be transferred by the overlapped sections 20, 63 from the waveguide core 12 to the active layer 60 and modulated by the active layer 60. In an embodiment, the light may be transferred by the overlapped sections 20, 63 from the waveguide core 12 to the active layer 60 and amplified by the active layer 60.

The segments 58 of the waveguide core 12 and the segments 64 of the active layer 60 may co-optimized across the bonding interface 41 to achieve efficient adiabatic vertical coupling with minimized footprint, insertion loss, and back reflection.

In an alternative embodiment, the active layer 60 may have incorporate satellite features that define a multiple-tip arrangement, and the satellite features may be segmented similar to the active layer 60.

Figure 13:
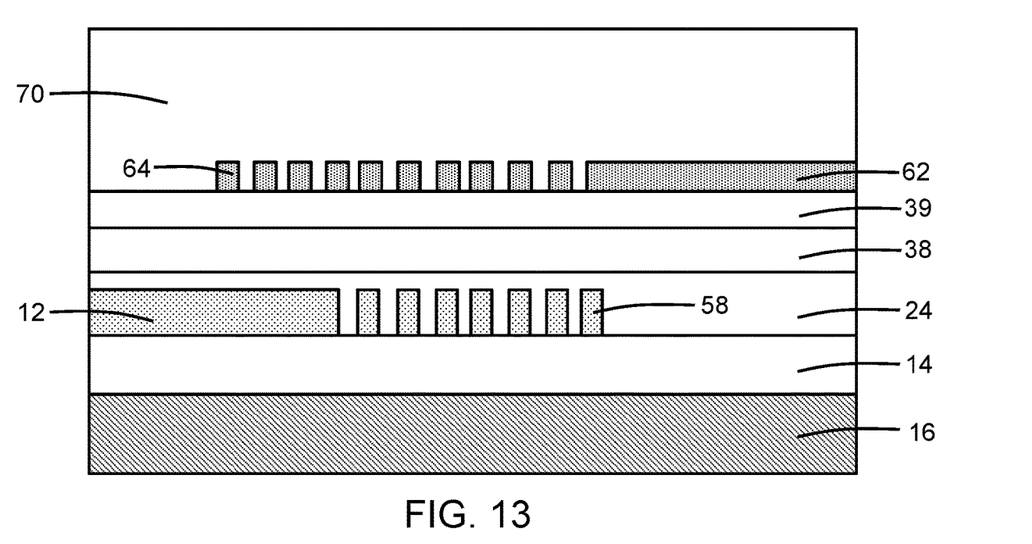
FIG. 13 is a cross-sectional view of the structure at a fabrication stage of the processing method subsequent to FIG. 12.

With reference to FIG. 13 in which like reference numerals refer to like features in FIG. 12 and at a subsequent fabrication stage, a dielectric layer 70 may be deposited over the active layer 60 and planarized. Dielectric material from the dielectric layer 70 may be disposed in the gaps between adjacent pairs of the segments 64. The segments 64 and the dielectric material of the dielectric layer 70 in the gaps between adjacent pairs of the segments 64 may define a metamaterial structure in which the material constituting the segments 64 has a higher refractive index than the dielectric material of the dielectric layer 70. The metamaterial structure can be treated as a homogeneous material having an effective refractive index that is intermediate between the refractive index of the material constituting the segments 64 and the refractive index of the dielectric material constituting the dielectric layer 70.

Figure 14:
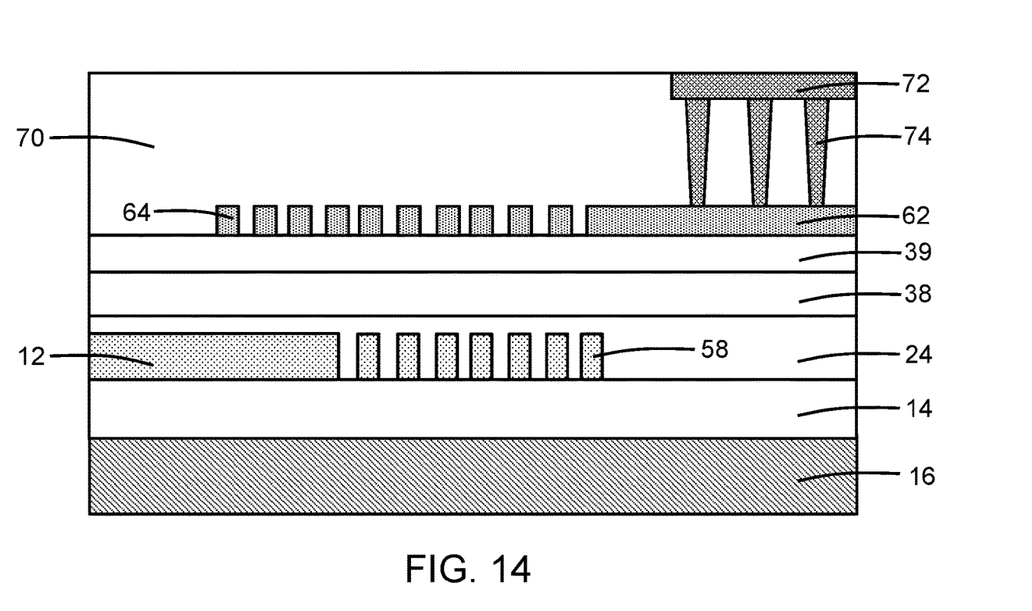
FIG. 14 is a cross-sectional view of a structure in accordance with alternative embodiments of the invention.

With reference to FIG. 14 in which like reference numerals refer to like features in FIG. 13 and in accordance with alternative embodiments, a metal feature 72 in the dielectric layer 70 may be connected by contacts 74 to the section 62 of the active layer 60. The active layer 60 may receive an operating voltage from the metal feature 72 that can be used to modulate light, amplify light, or generate light. The dielectric layer 70 may be comprised of, for example, silicon dioxide, the metal feature 72 may be comprised of, for example, copper, and the contacts 74 may be comprised of, for example, tungsten.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an optical coupler, the structure comprising:
   a first waveguide core including a first tapered section, the first waveguide core comprising a first passive material;
   a second waveguide core including a second tapered section overlapped with the first tapered section, the second waveguide core comprising a second passive material; and
   a semiconductor laser including a layer stack that has a plurality of layers, the layer stack including a third tapered section overlapped with the second tapered section, and each of the plurality of layers comprising a III-V compound semiconductor material.

2. The structure of claim 1 wherein the second passive material comprises silicon nitride, polysilicon, or amorphous silicon.

3. The structure of claim 1 further comprising:
   at least one dielectric layer positioned between the layer stack and the second waveguide core.

4. The structure of claim 1 wherein the second waveguide core includes an end, and the second tapered section of the second waveguide core terminates at the end.

5. The structure of claim 1 wherein the first waveguide core includes an end, and the first tapered section of the first waveguide core terminates at the end.

6. The structure of claim 1 wherein the layer stack includes an end, and the layer stack terminates at the end.

7. The structure of claim 1 wherein the first tapered section and the second tapered section taper in a first direction, and the third tapered section tapers in a second direction opposite from the first direction.

8. The structure of claim 1 wherein the first passive material comprises silicon.

9. The structure of claim 8 wherein the second passive material comprises silicon nitride, polysilicon, or amorphous silicon.

10. The structure of claim 1 wherein the layer stack is a mesa structure.

11. The structure of claim 1 wherein the layer stack lacks silicon.

12. The structure of claim 1 further comprising:
    a first dielectric layer; and
    a second dielectric layer
    wherein the first dielectric layer and the second dielectric layer are positioned between the layer stack and the second waveguide core, and the first dielectric layer and the second dielectric layer adjoin along a bonding interface.

13. The structure of claim 12 wherein the second waveguide core is embedded in the first dielectric layer.

14. The structure of claim 13 further comprising:
    a third dielectric layer; and
    a fourth dielectric layer,
    wherein the third dielectric layer and the fourth dielectric layer are positioned between the first dielectric layer and the second waveguide core.

15. The structure of claim 14 wherein the third dielectric layer and the fourth dielectric layer comprise different materials.

16. The structure of claim 15 wherein the third dielectric layer and the fourth dielectric layer conformally coat the second waveguide core.

17. The structure of claim 14 wherein the third dielectric layer is positioned between the fourth dielectric layer and the second waveguide core.

18. The structure of claim 17 wherein the third dielectric layer comprises silicon dioxide, the fourth dielectric layer comprises silicon nitride, and the second waveguide core comprises polysilicon.

19. A method of forming a structure for an optical coupler, the structure comprising:
    forming a first waveguide core including a first tapered section;
    forming a second waveguide core including a second tapered section overlapped with the first tapered section; and
    forming a semiconductor laser including a layer stack that has a plurality of layers and that includes a third tapered section overlapped with the second tapered section, wherein the first waveguide core comprises a first passive material, the second waveguide core comprises a second passive material, and each of the plurality of layers comprises a III-V compound semiconductor material.

20. The method of claim 19 wherein a first dielectric layer and a second dielectric layer are positioned between the second waveguide core and the layer stack, and the first dielectric layer and the second dielectric layer adjoin along a bonding interface.

* * * * *